(12) United States Patent
Nagae

(10) Patent No.: US 10,649,318 B2
(45) Date of Patent: May 12, 2020

(54) ELECTRONIC DEVICE CAPABLE OF UNLOCKING INTERCHANGEABLE UNIT DURING BLACKOUT, AND MONITORING SYSTEM

(71) Applicant: CANON KABUSHIKI KAISHA, Tokyo (JP)

(72) Inventor: Ryuichi Nagae, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/248,892

(22) Filed: Jan. 16, 2019

(65) Prior Publication Data

US 2019/0146309 A1 May 16, 2019

Related U.S. Application Data

(63) Continuation of application No. PCT/JP2017/024743, filed on Jun. 29, 2017.

(30) Foreign Application Priority Data

Jul. 20, 2016 (JP) ................................ 2016-142234

(51) Int. Cl.
*G03B 17/14* (2006.01)
*H04N 5/225* (2006.01)
*H04N 7/18* (2006.01)

(52) U.S. Cl.
CPC ........... *G03B 17/14* (2013.01); *H04N 5/2254* (2013.01); *H04N 7/183* (2013.01)

(58) Field of Classification Search
None
See application file for complete search history.

(56) References Cited

U.S. PATENT DOCUMENTS 5,012,264 A * 4/1991 Nagano ................. G03B 17/14
396/301
6,351,612 B1 * 2/2002 Misawa ................ G03B 17/14
396/287

(Continued)

FOREIGN PATENT DOCUMENTS

JP     2008-083377 A     4/2008
JP     2012-037693 A     2/2012

(Continued)

OTHER PUBLICATIONS

International Search Report of the corresponding International Application, PCT/JP2017/024743 dated Oct. 3, 2017, which is enclosed without an English Translation.

*Primary Examiner* — William B Perkey
(74) *Attorney, Agent, or Firm* — Cowan, Liebowitz & Latman, P.C.

(57) ABSTRACT

A monitoring camera which has a lock mechanism, which is capable to unlock a lens 1 even if power supply is stopped due to blackout. The lock mechanism includes a lock member 11 having a region 11b which is pushed by an operation member 3 in a state where a lock pin member 12 engages with the lens 1, a biasing member 13 biasing the lock member 11, and magnetic force generating units 10 generating magnetic forces by electro energization, to move against the biasing force so that the region 11c faces the operation member 3. While the magnetic forces are not generated in a non-electro energization state, the operation member 3 pushes the region 11b and thus moves the lock member 11 and the lock pin member 12 so that the lock pin member 12 is released from the lens 1.

7 Claims, 6 Drawing Sheets

(56) References Cited

U.S. PATENT DOCUMENTS 10,437,135 B2 * 10/2019 Yang .................. F16M 13/02
2013/0077953 A1 * 3/2013 Kikuchi ................ G02B 7/102
396/530

FOREIGN PATENT DOCUMENTS

| JP | 2012-043045 A | 3/2012 |
| JP | 2012-159627 A | 8/2012 |
| JP | 2015-222931 A | 12/2015 |
| WO | 2014/050333 A1 | 4/2014 |

* cited by examiner

ELECTRONIC DEVICE CAPABLE OF UNLOCKING INTERCHANGEABLE UNIT DURING BLACKOUT, AND MONITORING SYSTEM

CROSS-REFERENCE TO RELATED APPLICATIONS

This application is a Continuation of International Patent Application No. PCT/JP2017/024743, filed Jun. 29, 2017, which claims the benefit of Japanese Patent Application No. 2016-142234, filed Jul. 20, 2016, both of which are hereby incorporated by reference herein in their entirety.

BACKGROUND OF THE INVENTION

Field of the Invention

The present invention relates to an electronic device including an image pickup apparatus such as a monitoring camera in which an interchangeable unit such as a lens unit is detachably attached to a device main body such as a camera main body, and more particularly, relates to improvement of a lock mechanism of the interchangeable unit with respect to the device main body.

Background Art

To change, according to usage, shooting viewing angles of monitoring cameras which are installed outdoor, in stores or the like, lens units can be exchanged with respect to camera main bodies. Images shot by the monitoring cameras are monitored at remote places via communication lines or recorded in servers. Depending on installation places of the monitoring cameras, it is necessary to prevent the lens units from being detached or stolen by a mischief.

Conventionally, there is disclosed a technique of mounting a fingerprint sensor on a lock pin which locks a lens unit, cross-checking and authenticating a fingerprint during lens exchange, and unlocking the lens unit (Patent Literature 1). Furthermore, there is disclosed a technique of providing a lock attachment part to which a theft prevention member is attachable inside a tripod provided in an interchangeable lens apparatus (Patent Literature 2).

CITATION LIST

Patent Literature

PTL 1 Japanese Laid-Open Patent Publication (kokai) No. 2012-159627
PTL 2 Japanese Laid-Open Patent Publication (kokai) No. 2012-37693

However, according to above Patent Literature 1, the fingerprint is cross-checked to unlock the lens unit, and therefore if a power supply of a monitoring camera is turned off due to blackout, fingerprint authentication no longer functions and an interchangeable lens cannot be detached from a camera main body. In this case, the lens unit cannot be exchanged until restoration of the power supply, and workability lowers. Furthermore, above Patent Literature 2 cannot be applied to an interchangeable lens apparatus which does not include the tripod.

SUMMARY OF THE INVENTION

The present invention provides an electronic device which can lock/unlock an interchangeable unit with respect to a device main body in an on state of a power supply, and a technique can unlock the interchangeable unit with respect to the device main body even if the power supply is turned off due to blackout or the like while the interchangeable unit is in a locked state.

To achieve the above object, an electronic device according to the present invention comprising: a device main body; an interchangeable unit detachably attached to said device main body; a lock mechanism provided on said device main body, and configured to lock said interchangeable unit in a state where said interchangeable unit is attached to said device main body; and an operation member provided on said device main body and configured to unlock said interchangeable unit locked by said lock mechanism by a user performing a pushing operation, wherein said lock mechanism includes: a first lock member which is movable between a position at which said first lock member engages with said interchangeable unit in a state where said interchangeable unit is attached to said device main body and a position at which said first lock member does not engage with said interchangeable unit; a second lock member which is movable with respect to said first lock member, includes a first region which is to be pushed by the pushing operation with respect to said operation member and a second region which is not to be pushed by the pushing operation with respect to said operation member in a state where said first lock member engages with said interchangeable unit, and is movable between a position at which said first region faces said operation member and a position at which said second region faces said operation member; a biasing member configured to bias said second lock member to move to the position at which said first region faces said operation member; and a magnetic force generating mechanism configured to generate a magnetic force between said magnetic force generating mechanism and said second lock member by electro energization control to move against a biasing force of said biasing member to the position at which said second region faces said operation member, and wherein by the pushing operation with respect to said operation member pushing said first region in a state where the magnetic force is not generated by non-electro energization control on said magnetic force generating mechanism, said second lock member moves together with said first lock member in a direction in which said first region is pushed, and moves said first lock member to a position at which said first lock member does not engage with said interchangeable unit.

Further features of the present invention will become apparent from the following description of exemplary embodiments (with reference to the attached drawings).

DESCRIPTION OF THE EMBODIMENTS

One example of an embodiment of the present invention will be described below with reference to the drawings.

Figure 1A:
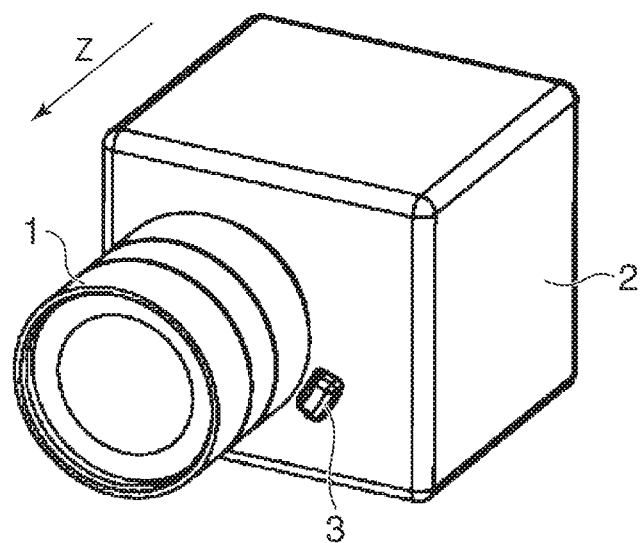
FIG. 1A is a front side perspective view of a monitoring camera which is one example of an embodiment of an electronic device according to the present invention.
Figure 1B:
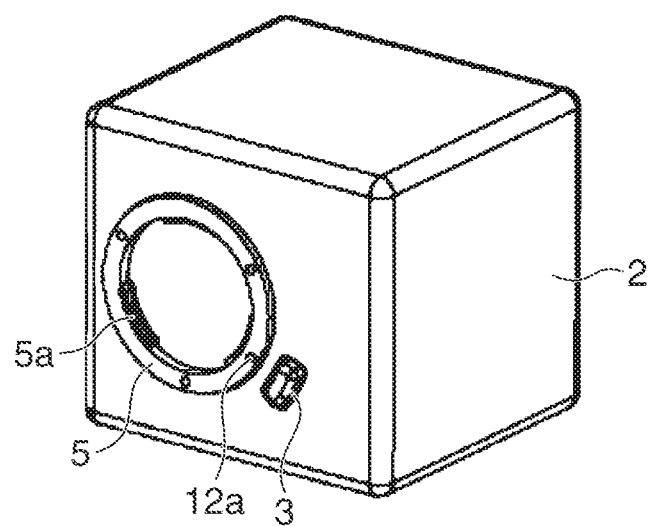
FIG. 1B is a front side perspective view showing a state where a lens unit is detached from the monitoring camera shown in FIG. 1A.

FIG. 1A is a front side perspective view of a monitoring camera which is one example of the embodiment of an electronic device according to the present invention, and FIG. 1B is a front side perspective view showing a state where a lens unit is detached from the monitoring camera shown in FIG. 1A.

Regarding a monitoring camera according to the present embodiment, as shown in FIGS. 1A and 1B, an interchangeable lens unit 1 is detachably attached to a front side (subject side) of a camera main body 2. A mount part 5 to which the lens unit 1 is attached is formed on the front side of the camera main body 2, and a lock pin 12a which locks/unlocks the lens unit 1 with respect to the camera main body 2 is disposed on a surface on the subject side of the mount part 5 moveably forward and backward (appear and disappear) in an optical axis direction. The camera main body 2 corresponds to one example of a device main body of the present invention, and the lens unit 1 corresponds to one example of an interchangeable unit of the present invention.

Furthermore, an operation member 3 on which a user performs a pushing operation to unlock the lens unit 1 is provided to the camera main body 2 on a right side of the mount part 5 in FIG. 1B. The operation member 3 is biased toward the subject side in the optical axis direction (a z axis direction in FIG. 1A) by a biasing spring 13 (see FIG. 4) described below. An inner circumferential side of the mount part 5 of the camera main body 2 is provided with claw parts 5a to which claw parts (not shown) of the lens unit 1 are bayonet-coupled when the lens unit 1 is attached, at three portions at substantially equal intervals in a circumferential direction.

Figure 2:
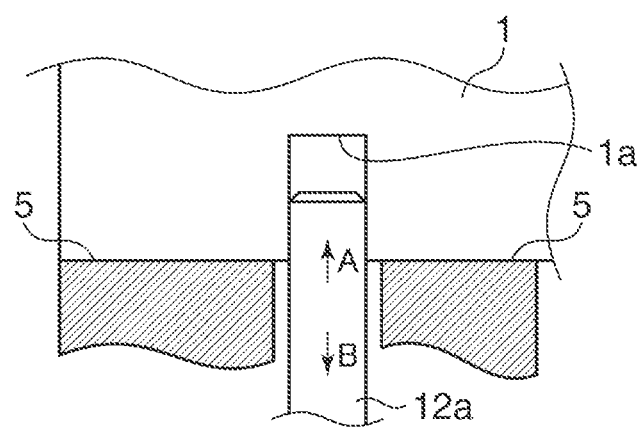
FIG. 2 is a main part cross-sectional view for explaining an operation of a lock pin.

FIG. 2 is a main part cross-sectional view for explaining an operation of the lock pin 12a. In a state shown in FIG. 2, the lock pin 12a protrudes toward the subject side in the optical axis direction (an arrow A direction shown in FIG. 2), and is inserted and engaged in an insertion hole 1a formed in the lens unit 1. In this state, rotation of the lens unit 1 with respect to the camera main body 2 is regulated and the bayonet-coupling is maintained.

By the user performing a pushing operation on the operation member 3 in the state shown in FIG. 2, the lock pin 12a moves in a direction (arrow B direction) opposite to the arrow A direction shown in FIG. 2 in conjunction with the pushing operation, retreats from a surface on the subject side of the mount part 5, and is withdrawn from the insertion hole 1a of the lens unit 1. In a state where the lock pin 12a is withdrawn from the insertion hole 1a, rotation of the lens unit 1 with respect to the camera main body 2 is deregulated. Hence, by rotating the lens unit 1 and decoupling the bayonet-coupling, it is possible to detach the lens unit 1 from the camera main body 2 and exchange the lens unit. In a case where the lens unit 1 is attached to the camera main body 2, a reverse operation to the above operation is performed. It should be noted that an operation of the lock pin 12a will be described in detail below with reference to FIGS. 5A, 5B, 6A and 6B.

Figure 3:
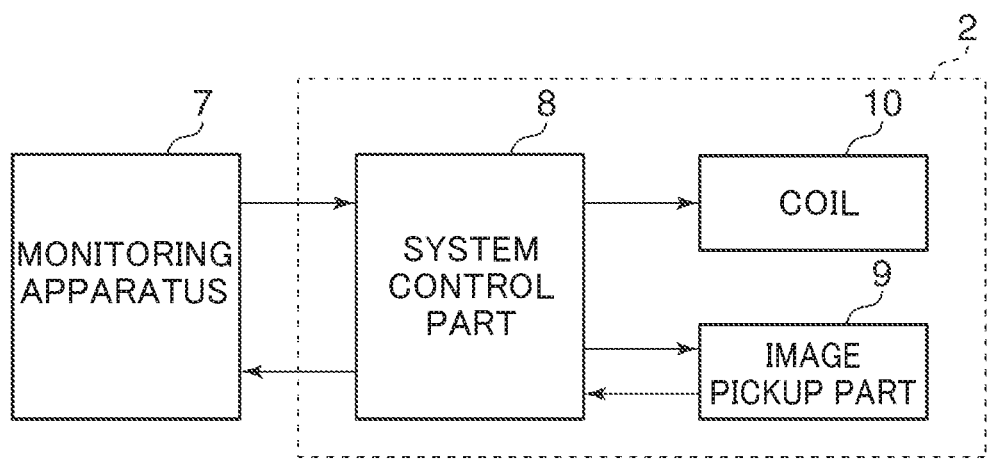
FIG. 3 is a control block diagram showing a schematic configuration of an image monitoring system configured by connecting the monitoring camera and an external monitoring apparatus communicably via a communication unit.

FIG. 3 is a control block diagram showing a schematic configuration of an image monitoring system configured by connecting the camera main body 2 of the monitoring camera according to the present embodiment and a monitoring apparatus 7 such as an external server communicably via a communication unit such as a network.

In FIG. 3, the monitoring apparatus 7, which includes the server or the like, is communicably connected with a system control part 8 of the camera main body 2 via the communication unit such as the network, and can remotely operate the monitoring camera. The camera main body 2 includes the system control part 8, an image pickup part 9 and a coil 10. The system control part 8 includes a CPU, a ROM and a RAM, and controls operations of overall the monitoring camera including the lens unit 1, the image pickup part 9, the coil 10 and so on, and the operation of the monitoring camera based on an instruction from the monitoring apparatus 7.

For example, the system control part 8 obtains an image picked up by the image pickup part 9 according to a shooting instruction from the monitoring apparatus 7, and transfers the obtained image to the monitoring apparatus 7 via the network or the like. Consequently, it is possible to monitor and record the image shot by the monitoring camera from a remote place by using the monitoring apparatus 7. The camera main body 2 is provided with a substrate for performing shooting, which includes an image pickup device which constitutes the image pickup part 9, and a control substrate which controls a network system (not shown).

Figure 4:
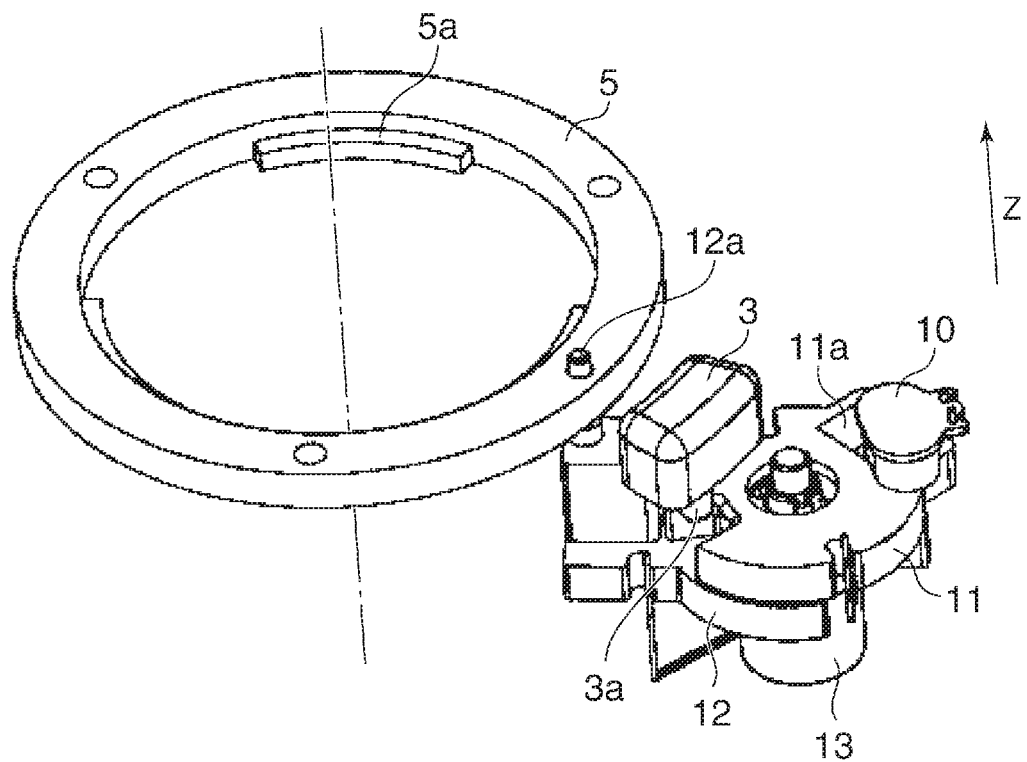
FIG. 4 is a perspective view for explaining a lock mechanism of the monitoring camera in FIG. 1A.

FIG. 4 is a perspective view for explaining a lock mechanism included in the monitoring camera in FIG. 1A.

In FIG. 4, the camera main body 2 includes the lock mechanism which locks/unlocks the lens unit 1 with respect to the camera main body 2. The lock mechanism includes the coil 10, a lock member 11, a lock pin member 12 and the biasing spring 13, and causes the lock pin 12a of the lock pin member 12 to move forward and backward. The lock member 11 is formed in a substantially disk shape, and includes a driving magnet 11a. The magnet 11a is provided on a subject side in the optical axis direction of the lock member 11 while facing the coil 10. The coil 10 is connected to the system control part 8 via an electric circuit (not shown). The system control part 8 performs electro energization/non-electro energization switching control on the coil 10 via the electric circuit to control generation/non-generation of a magnetic force. The coil 10 and the magnet 11a correspond to one example of magnetic force generating mechanism of the present invention.

The lock pin member 12 is provided substantially coaxially with the lock member 11. The lock pin member 12 is disposed, while sandwiching the lock member 11 between the lock pin member 12 and the coil 10 in the optical axis direction, and includes the lock pin 12a. The lock member 11 and the lock pin member 12 are integrally provided movably in the optical axis direction. Furthermore, the operation member 3 includes an axle part 3a which pushes the lock member 11 and moves the lock pin member 12 in the optical axis direction when the user performs the pushing operation on the operation member 3. The lock pin member 12 corresponds to one example of a first lock member of the present invention, and the lock member 11 corresponds to one example of a second lock member of the present invention.

The biasing spring 13 is formed by, for example, a torsion spring, and includes a coil part and a pair of leg parts (not shown) respectively formed at both ends of the coil part. The coil part is disposed so as to sandwich the lock pin member 12 between the coil part and the lock member 11. Furthermore, the one leg part out of the one pair of leg parts is locked by the lock member 11, and the other leg part is locked by the lock pin member 12. Thus, the lock member 11 is biased with respect to the lock pin member 12 in a counterclockwise direction shown in FIG. 4, and the coil part biases the lock member 11 and the lock pin member 12 toward the subject side in the optical axis direction which is shown as an arrow Z direction in FIG. 4. The biasing spring 13 corresponds to one example of a biasing member of the present invention.

Figure 5A:
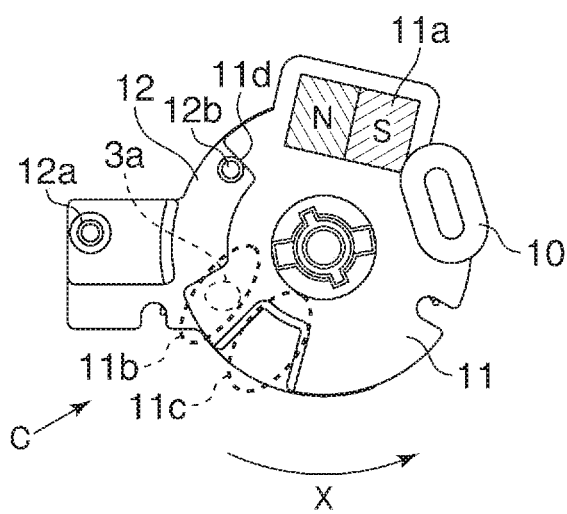
FIG. 5A is a view showing a lock member and a lock pin member seen from a subject side in an optical axis direction in a state where a coil does not generate a magnetic force.
Figure 5B:
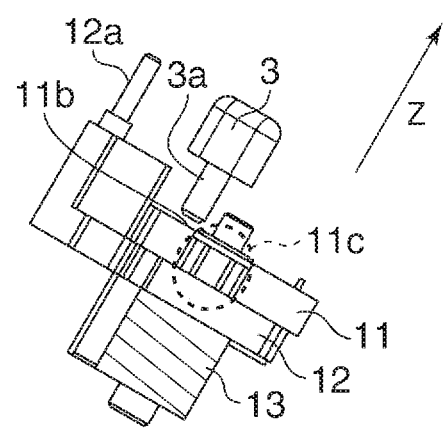
FIG. 5B is a view seen from an arrow C direction in FIG. 5A.

Next, a method for attaching/detaching the lens unit 1 to and from the camera main body 2 will be described with reference to FIGS. 5A, 5B, 6A and 6B. FIG. 5A is a view showing the lock member 11 and the lock pin member 12 seen from the subject side in the optical axis direction in a state where the coil 10 does not generate the magnetic force. FIG. 5B is a view seen from an arrow C direction in FIG. 5A. The lens unit 1 is attached/detached while the power supply of the monitoring camera is turned off or in a case where the monitoring apparatus 7 makes an instruction to attach/detach the lens unit 1 to or from the system control part 8 of the monitoring camera.

While the power supply of the monitoring camera is turned off, the system control part 8 does not electrically energize the coil 10, and therefore the coil 10 does not generate the magnetic force. In the case where the monitoring apparatus 7 instructs the system control part 8 of the monitoring camera to attach/detach the lens unit 1, the system control part 8 performs non-electro energization control on the coil 10, and therefore the coil 10 does not generate the magnetic force.

The state shown in FIGS. 5A and 5B is a state where the lens unit 1 is unlocked with respect to the camera main body 2. In this case, as described above, the biasing spring 13 biases the lock member 11 with respect to the lock pin member 12 in the counterclockwise direction (arrow X direction) in FIG. 5A. The lock member 11 stops when a contact part 11d comes into contact with a stopper part 12b of the lock pin member 12 in a rotation direction. Furthermore, the lock member 11 includes a first region 11b which the axle part 3a comes into contact with in the optical axis direction when the user performs the pushing operation on the operation member 3, and a second region 11c which the axle part 3a does not come into contact with when the user performs the pushing operation on the operation member 3. By cutout part being formed on the lock member 11, the axle part 3a does not contact with the second region 11c in the optical axis direction when the user performs the pushing operation on the operation member 3.

In a case where the coil 10 does not generate the magnetic force, the first region 11b of the lock member 11 is positioned so as to face the axle part 3a of the operation member 3 in the optical axis direction as shown in FIGS. 5A and 5B. Hence, when the user performs the pushing operation on the operation member 3, the axle part 3a pushes the lock member 11 and the lock pin member 12 together, and the lock pin 12a sinks through the surface on the subject side of the mount part 5.

Consequently, the lens unit 1 can be attached/detached to or from the camera main body 2. By rotating the lens unit 1 with respect to the camera main body 2 in a detachment direction of the lens unit 1 in a state where the user pushes the operation member 3, it is possible to decouple the bayonet-coupling, and detach the lens unit 1 from the mount part 5. When the lens unit 1 is attached, the user places the interchangeable lens unit 1 in contact with the mount part 5 of the camera main body 2, and rotates the lens unit 1 with respect to the camera main body 2 in an attachment direction of the lens unit. Thus, the lens unit 1 and the mount part 5 are bayonet-coupled, so that the lens unit 1 is attached to the camera main body 2.

When a user lets go of the operation member 3 after the lens unit 1 is attached, the lock pin member 12 is biased again by the biasing spring 13 toward the subject side in the optical axis direction (Z direction). Hence, the lock pin 12a protrudes through the surface on the subject side of the mount part 5 and is inserted in the insertion hole 1a of the lens unit 1, so that rotation of the lens unit 1 with respect to the camera main body 2 is regulated.

Figure 6A:
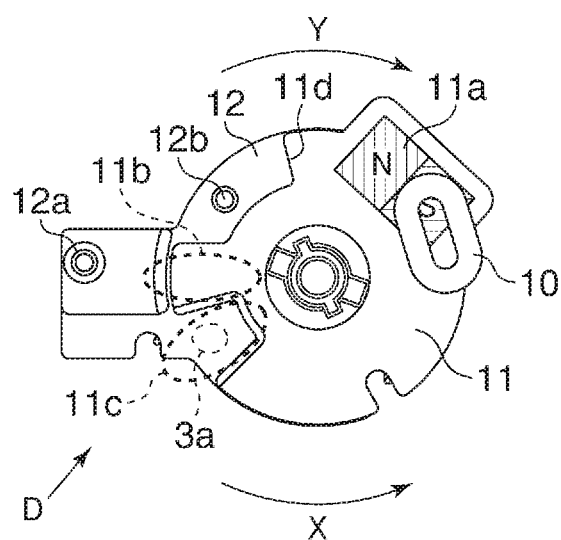
FIG. 6A is a view showing a lock member and a lock pin member seen from the subject side in the optical axis direction in a state where the coil generates the magnetic force.
Figure 6B:
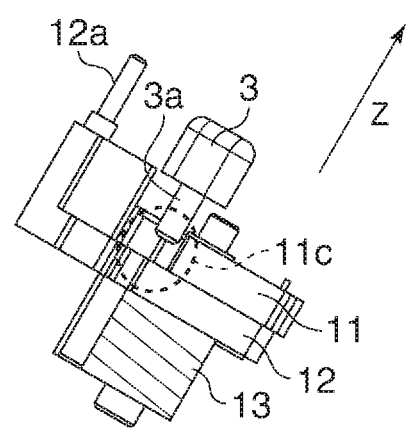
FIG. 6B is a view seen from an arrow D direction in FIG. 6A.

FIG. 6A is a view showing the lock member 11 and the lock pin member 12 seen from the subject side in the optical axis direction in a state where the coil 10 generates the magnetic force, and FIG. 6B is a view seen from an arrow D direction in FIG. 6A. An operation of locking the lens unit 1 attached to the camera main body 2 will be described below.

To lock the lens unit 1, a user operation makes a lock instruction from the monitoring apparatus 7 to the system control part 8 of the monitoring camera. The system control part 8 of the monitoring camera instructs to electrically energize the coil 10 according to the lock instruction. When the coil 10 is electrically energized, the coil 10 generates the magnetic force. In the present embodiment, in a state shown in FIG. 5A, the magnet 11a of the lock member 11 is disposed between the contact part 11d which comes into contact with the stopper part 12b and the coil 10, such that the magnetic pole on a side close to the coil 10, out of the S pole and the N pole arranged in the rotation direction of the lock member 11, is the S pole. The coil 10 is arranged so as to generate magnetic force by the coil 10 being electrically energized so that the N pole is on a side facing the lock member 11. Hence, by the coil 10 being electrically energized, the magnetic force (N pole) generated on the side facing the lock member 11 of the coil 10 makes the coil 10 and the S pole of the magnet 11a of the lock member 11 attract each other, and the lock member 11 rotates in the clockwise direction (arrow Y direction) as shown in FIG. 6A.

That is, as described above, the lock member 11 is biased by the biasing spring 13 with respect to the lock pin member 12 in the counterclockwise direction (X direction) in FIG. 6A. Meanwhile, the magnetic force generated by the coil 10 generates, on the lock member 11, a rotation force greater than the biasing force in the X direction generated by the biasing spring 13, in a direction (Y direction) opposite to the biasing direction (X direction) of the biasing spring 13. Thus, the lock member 11 rotates in the clockwise direction (Y direction) in FIG. 6A with respect to the lock pin member 12 and to a position at which the second region 11c overlaps the axle part 3a when seen from the optical axis direction.

The second region 11c is a region which the axle part 3a does not come into contact with even when the user performs the pushing operation on the operation member 3 in the optical axis direction, as described above. Therefore, even when the user performs the pushing operation on the operation member 3 in the optical axis direction, only the operation member 3 is pushed, and the axle part 3a does not push the lock member 11. Hence, the lock pin member 12 is not pushed, that is, a state where the lock pin 12a is engaged with the lens unit 1 is maintained. That is, even when the user performs the pushing operation on the operation member 3, the lens unit 1 is not unlocked, and the locked state is maintained.

Next, an operation of the lock mechanism in a case where the power supply of the monitoring camera is turned off due to blackout in a state where the lens unit 1 is locked (the state in FIGS. 6A and 6B) will be described.

When the power supply of the monitoring camera is turned off in the state shown in FIGS. 6A and 6B where the lens unit 1 is locked, the electro energization of the coil 10 is blocked, and the coil 10 does not generate the magnetic force. Hence, the lock member 11 is rotated in the X direction from the state in FIG. 6A by the biasing force of the biasing spring 13, and enters the state shown in FIG. 5A. In this state, the lens unit 1 is unlocked and, as described above, the lens unit 1 can be attached/detached to or from the camera main body 2.

As described above, according to the present embodiment, even when the power supply of the monitoring camera, which can lock/unlock the lens unit 1 with respect to the camera main body 2 in the on state of the power supply, is turned off in the locked state due to blackout, the lens unit 1 can be unlocked with respect to the camera main body 2. Consequently, it is possible to easily detach the lens unit 1 even in the off state of the power supply, and consequently improve workability for exchanging the lens unit 1 during the blackout.

It should be noted that the configuration of the present invention is not limited to the configuration of the above embodiment, and the materials, the shapes, the dimensions, the forms, the numbers and the arrangement positions can be optionally changed without departing from the gist of the present invention. Furthermore, the above embodiment has described the example where the device main body is the monitoring camera and the monitoring apparatus is the server. However, embodiments to which the present invention is applied are not limited to this.

According to the present invention, regarding an electronic device which can lock/unlock an interchangeable unit with respect to a device main body in an on state of a power supply, it is possible to unlock the interchangeable unit with respect to the device main body and easily detach the interchangeable unit, even if the power supply is turned off due to blackout or the like while the interchangeable unit is in a locked state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device connected to a monitoring apparatus communicably via a network, the monitoring apparatus being able to send an instruction to said electronic device, said electronic device comprising:
   a device main body;
   an interchangeable unit detachably attached to said device main body; and
   a lock mechanism provided on said device main body, and configured to lock said interchangeable unit in a state where said interchangeable unit is attached to said device main body,
   wherein a switching control between electro energization and non-electro energization is performed on said lock mechanism,
   wherein the electro energization on said lock mechanism is performed in a case where a power supply of said electronic device is turned on, whereas the non-electro energization on said lock mechanism is performed in a case where a state of the power supply is shifted from a state of being turned on to a state of being turned off,
   wherein a state of said lock mechanism can be varied to a locked state in which the electro energization is performed and said interchangeable unit cannot be detached from said device main body or an unlocked state in which the non-electro energization is performed and said interchangeable unit can be detached from said device main body, and
   wherein even though the power supply of said electronic device is turned on, the electro energization on said lock mechanism is shifted to the non-electro energization on said lock mechanism in a case where an instruction to switch from the electro energization on said lock mechanism to the non-electro energization on said lock mechanism is received from the monitoring apparatus.

2. The electronic device according to claim 1, further comprising an operation member provided on said device main body and configured to unlock said interchangeable unit locked by said lock mechanism by a user performing a pushing operation, wherein
   said lock mechanism includes:
      a first lock member which is movable between a position at which said first lock member engages with said interchangeable unit in a state where said interchangeable unit is attached to said device main body and a position at which said first lock member does not engage with said interchangeable unit;
a second lock member which is movable with respect to said first lock member, includes a first region which is to be pushed by the pushing operation with respect to said operation member and a second region which is not to be pushed by the pushing operation with respect to said operation member in a state where said first lock member engages with said interchangeable unit, and is movable between a position at which said first region faces said operation member and a position at which said second region faces said operation member;
a biasing member configured to bias said second lock member to move to the position at which said first region faces said operation member; and
a magnetic force generating mechanism configured to generate a magnetic force between said magnetic force generating mechanism and said second lock member by electro energization control to move against a biasing force of said biasing member to the position at which said second region faces said operation member,
wherein by the pushing operation with respect to said operation member pushing said first region in a state where the magnetic force is not generated by non-electro energization control on said magnetic force generating mechanism, said second lock member moves together with said first lock member in a direction in which said first region is pushed, and moves said first lock member to a position at which said first lock member does not engage with said interchangeable unit.

3. The electronic device according to claim 2, wherein said magnetic force generating mechanism is formed by a magnet provided on said second lock member, and a coil disposed facing said magnet and to be subjected to a switching control between electro energization and non-electro energization.

4. The electronic device according to claim 2, wherein said device main body is a camera main body of a monitoring camera including an image pickup part, and said interchangeable unit is a lens unit detachably attached to said camera main body.

5. The electronic device according to claim 4, wherein said lens unit is rotated with respect to said camera main body and thereby bayonet-coupled to said camera main body, and said first lock member engages with said lens unit in a state where said lens unit is bayonet-coupled, and is movable between a position at which said first lock member regulates the rotation of said lens unit and a position at which said first lock member does not engage with said lens unit.

6. The electronic device according to claim 2, wherein said second region is a cutout part formed on said second lock member.

7. A monitoring system comprising:
an electronic device; and
a monitoring apparatus connected to said electronic device communicably via a communication unit, configured to instruct said electronic device to perform a switching control between electro energization and non-electro energization on a lock mechanism of said electronic device, and configured to obtain an image picked up by an image pickup part,
wherein said electronic device comprises:
a device main body;
an interchangeable unit detachably attached to said device main body; and
a lock mechanism provided on said device main body, and configured to lock said interchangeable unit in a state where said interchangeable unit is attached to said device main body,
wherein the electro energization on said lock mechanism is performed in a case where a power supply of said electronic device is turned on, whereas the non-electro energization on said lock mechanism is performed in a case where a state of the power supply is shifted from a state of being turned on to a state of being turned off
wherein a state of said lock mechanism can be varied to a locked state in which the electro energization is performed and said interchangeable unit cannot be detached from said device main body or an unlocked state in which the non-electro energization is performed and said interchangeable unit can be detached from said device main body, and
wherein even though the power supply of said electronic device is turned on, the electro energization on said lock mechanism is shifted to the non-electro energization on said lock mechanism in a case where an instruction to switch from the electro energization on said lock mechanism to the non-electro energization on said lock mechanism is received from the monitoring apparatus.

* * * * *